United States Patent [19]
Pfannkoch

[11] Patent Number: 4,808,233
[45] Date of Patent: Feb. 28, 1989

[54] METHOD FOR HIGH PH WASHING OF SILICA-BASED CHROMATOGRAPHIC SORBENTS

[75] Inventor: Edward A. Pfannkoch, Ellicott City, Md.

[73] Assignee: W. R. Grace & Co.-Conn., New York, N.Y.

[21] Appl. No.: 69,473

[22] Filed: Jul. 2, 1987

[51] Int. Cl.$^4$ ............................................. B08B 3/00
[52] U.S. Cl. .................................. 134/2; 210/198.2; 210/635; 210/656; 210/670
[58] Field of Search ................... 134/2; 210/635, 656, 210/670, 198.2

[56] References Cited

U.S. PATENT DOCUMENTS

| | | | |
|---|---|---|---|
| 2,241,984 | 5/1941 | Cooper | 252/156 |
| 2,419,805 | 4/1947 | Wegst et al. | 252/156 |
| 2,447,297 | 8/1948 | Wegst et al. | 252/156 |
| 4,245,005 | 1/1981 | Regnier et al. | 428/420 |
| 4,600,646 | 7/1986 | Stout | 428/405 |
| 4,658,975 | 3/1987 | Barkatt et al. | 210/656 |

OTHER PUBLICATIONS

Ballou et al in J. Appl. Chem. Biotechnol. 23, 119–130 (1973).
Burkard et al in Am. Soc. Brewing Chemists Proc. 1950; 83–100 (1951).
Hudson and Bacon in Ceramic Bulletin, 37, 185–128 (1958).
Alpert and Regnier, J. Chromatogr., 185, 375–392 (1979), "Preparation of Porous Microparticulate Anion-Exchange Chromatography Support for Proteins".
Iler, J. Colloid and Inter. Sci, 43, 399–408, 1973, "Effect of Adsorbed Alumina on the Solubility of Amorphous Silica in Water".
J. G. Atwood et al, J. Chromatogr., 171, 109–115 (1979), "Improvements in Liquid Chromatography Column Life and Method Flexibility by Saturating the Mobile Pyhase with Silica".

*Primary Examiner*—Asok Pal
*Attorney, Agent, or Firm*—Edward J. Cabic

[57] ABSTRACT

Chromatographic sorbents containing silica are cleaned by using a caustic wash solution having a caustic agent dissolved in water and having aluminum or gallium ions present at an effective concentration so as to prevent deterioration of the sorbent. Caustic solutions having a pH above 8 can be used with a preferred solution having a pH above 13. The cleaning solutions typically have aluminum or gallium ions present at a concentration of from about 0.0005 to 0.1 normal.

16 Claims, 6 Drawing Sheets

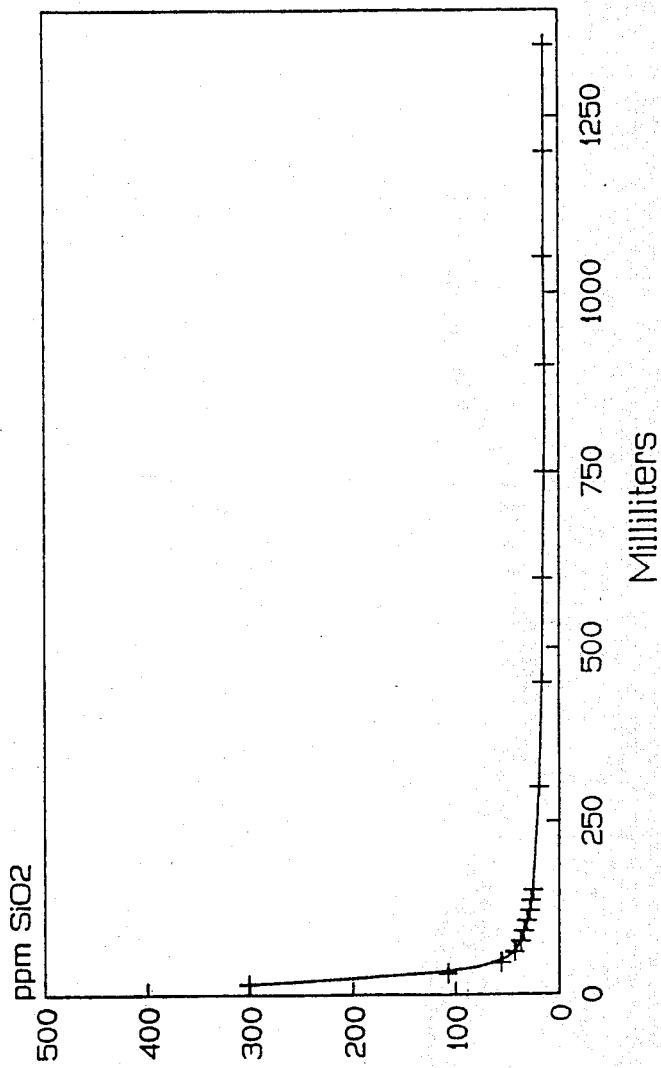

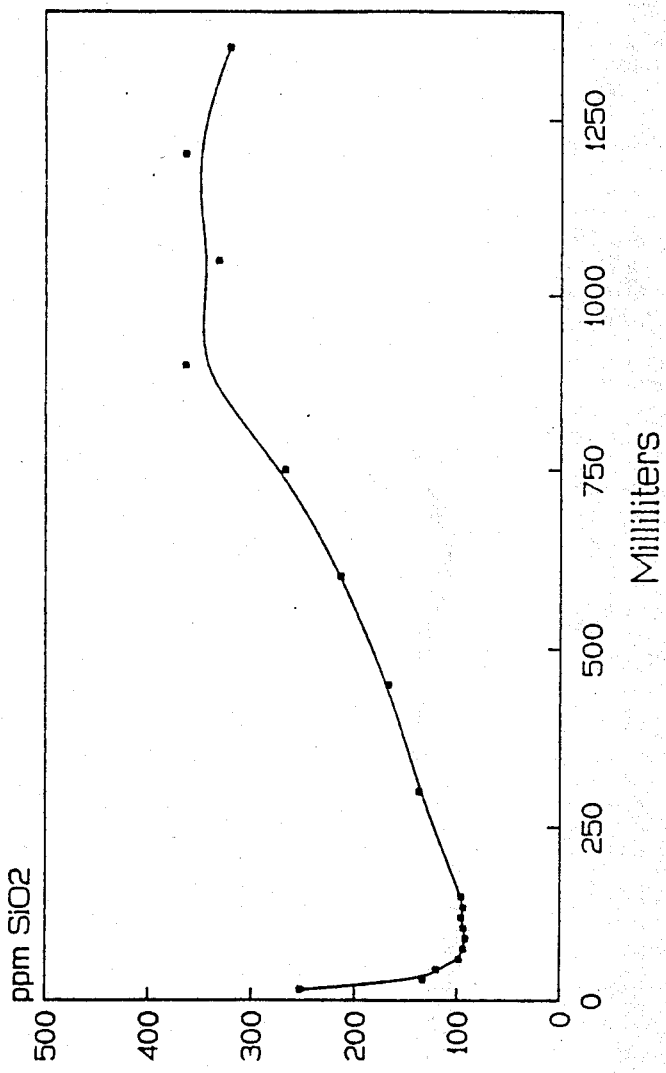

METHOD FOR HIGH PH WASHING OF SILICA-BASED CHROMATOGRAPHIC SORBENTS

BACKGROUND OF THE INVENTION

1. Field of the Invention

This invention relates to a procedure for high pH washing and depyrogenation of silica-based anion-exchange chromatographic sorbents.

2. Description of the Previously Published Art

In preparative or process scale production of injectables such as peptides, proteins, and pharmaceuticals the product must be purified to meet various quality control and regulatory specifications. Column chromatography is often used in large part to purify these products.

One critical issue regulating injectables is the level of pyrogen contamination in the product. Pyrogens, or fever inducing substances, are widely diverse materials ranging from inorganic to organic compounds. The pyrogens of specific concern in genetically engineered or biologically produced injectables are anionic lipopolysaccharide bacterial cell wall components. The level of contamination by these bacterial cell wall pyrogens is strictly regulated by the Food and Drug Administration.

To maintain pyrogen levels in chromatographically purified products below FDA approved limits, organic resin based anion-exchange sorbents are routinely depyrogenated or washed with high pH caustic solutions. These washes are normally specified as ranging between 0.1 and 0.5N NaOH (pH 13-13.7). These washes are accepted as effective cleaning methods for depyrogenation of chromatographic sorbents.

High performance silica-based chromatographic sorbents can not be washed with this standard procedure due to the silica support's extremely high solubility at these alkaline pH's. The chromatographic bed rapidly deteriorates, causing channelling, loss of resolution and loading capacity and ultimately fouling of the bed which prevents passage of solutions through the column even at very high pressure. Since silica based anion-exchange sorbents cannot be cleaned and depyrogenated using standard high pH washes, the use of these media for preparation of injectables has been extremely limited.

High performance silica-based chromatographic sorbents can differ significantly from organic resin based chromatographic sorbents in their composition which can lead to confusion in terminology. The chromatographically active particles hereafter are referred to as the sorbent or packing material. In the case of high performance chromatographic sorbents, the particles usually comprise an inorganic support, often porous, which is modified with an appropriate organic coating or stationary phase to confer the chromatographic properties to the sorbent.

Large-scale column chromatography using "soft-gel" or organic resin based chromatographic sorbents has been widely used for purification of injectables despite several limitations imposed by the poor mechanical strength of these column packing materials. Column beds are susceptible to compression and plugging under high flow rates, high particle attrition during stirring, severe bed shrinkage and swelling during solvent changes or gradient elution, low loading capacity for high molecular weight compounds and relatively low resolution separations due to the large particle diameter packings. Inorganic, or silica-based chromatographic sorbents by virtue of their superior mechanical strength and wide pore structure overcome virtually all of these soft-gel limitations.

One advantage provided by organic resin based sorbents is chemical stability to a variety of solutions, including aqueous solutions in the pH range from 2-14. This allows the use of very high pH solutions (pH 13-14) to clean and depyrogenate the chromatographic packing material. Siliceous supports are known to dissolve and deteriorate rapidly when washed with solutions above pH 8.

Three general approaches have been used to attempt to extend the useful upper pH limit of silica-based chromatographic sorbents.

1. Polymeric organic coatings have been used to simultaneously confer the required chromatographic functional groups and protect the silica surface during exposure to high pH. U.S. Pat. No. 4,245,005 and Alpert and Regnier, *J. Chromatogr.*, 185, 375-392 (1979) teach that adsorbed, crosslinked coatings of polyethyleneimine on silica, controlled porosity glass and related inorganic supports exhibit improved stability in aqueous solutions relative to the uncoated support. The upper pH limit on these types of packing materials is about pH 9.

2. Treatment of the silica particle with metal oxides, hydroxides, etc. to confer improved pH stability to the inorganic support. It is well known that the adsorption on silica of alumina and other metal oxides and hydroxides can confer improved pH stability to the silica particle. Iler in *J. Colloid and Inter. Sci,* 43, 399-408, 1973 shows that in static systems at pH 8 colloidal silica is stabilized in the presence of aluminum ions. The effectiveness of the stabilization is related to the proportions of silica and alumina on the surface at equilibrium. U.S. Pat. No. 4,600,646 relates to the production of a surface stabilized porous silica having a discontinuous metal oxide layer over the silica. The protected support particles and chromatographic packings thus produced have enhanced pH stability in chromatographic eluents to a maximum practical value of pH 9. U.S. Pat. No. 4,648,975 relates to a process of using silica-based sorbents modified with various metal oxides, hydroxides and related materials to carry out chromatographic separations at pH's above the normal upper limit of pH 8. The preferred pH range stated in the claims is pH 8-10. This invention does not describe an extremely high pH washing protocol acceptable for cleaning and depyrogenation of chromatographic columns.

3. Guard columns of silica particles have been used to pre-saturate the solvent stream with dissolved silica to suppress dissolution of the silica in the chromatographic column. This technique is described by Atwood et al in *J. Chromatogr.*, 171, 109-115 (1979) and is well known to practitioners of the chromatographic art. The upper pH limit when this technique is employed is about pH 9.

As discussed above, previous attempts to stabilize silica-based chromatographic sorbents to extend the useful upper pH range above pH 8 do provide some protection of the support for chromatographic separations carried out in the pH range from 8-10. All of the above approaches fail to provide adequate protection when extremely high (pH 13-14) washes are used to clean and depyrogenate the chromatographic column due to the extremely high silica solubility (technique 1 and 3) or high leaching rates of applied metal oxide type coatings (technique 2) at these extreme pH's.

OBJECTS OF THE INVENTION

It is an object of this invention to be able to clean silica containing chromatographic sorbents under alkaline conditions such that the silica does not substantially dissolve.

It is a further object of this invention to add to a caustic cleaning solution a dopant which will prevent the deterioration of the silica in the chromatographic sorbent.

It is a further object of this invention to develop a procedure to clean anion-exchange chromatographic sorbents, and specifically silica-based anion-exchange chromatographic sorbents, by employing strongly alkaline solutions as recommended for depyrogenation of organic gel chromatographic packing materials.

It is a further object of this invention to provide a procedure to clean anion-exchange chromatographic sorbents, and specifically silica-based chromatographic sorbents, using sodium, potassium or ammonium hydroxide solutions ranging in concentration from about 0.1 to 1N.

It is a further object of this invention to provide a cleaning solution for silica-based chromatographic sorbents which will not substantially dissolve the silica.

These and further objects will become apparent as the description of the invention proceeds.

SUMMARY OF THE INVENTION

Anion-exchange chromatographic sorbents, and specifically silica-based chromatographic sorbents can be cleaned by using caustic solutions such as sodium hydroxide or potassium hydroxide solutions or ammonium hydroxide solutions which are doped with an aluminum or gallium salt in a column stabilizing effective amount. The aluminum or gallium can be added in the form of a readily soluble salt or in a form which can be slowly dissolved by the caustic. In the preferred embodiments, the amount of aluminum used is the amount obtained when using aluminum nitrate concentrations ranging from 0.0005N to 0.1N. The caustic solutions employed here with the dopant have a pH above 8 since this is the pH level at which silica containing supports are normally attacked. In a more preferred embodiment the cleaning can take place with stronger caustic solutions having a pH of at least 13 and wherein the caustic agent ranges in concentration from about 0.1 to 1N.

These wash solutions are pumped directly through the chromatography column following a chromatographic separation to strip tightly bound material and pyrogens from the column bed. The exact mechanism by which the invention works is not known. It is believed that extremely low levels of aluminum are incorporated into the silica support as aluminosilicates which suppresses the silica solubility. However, it has been demonstrated that the presence of these one time incorporated aluminum species is not sufficient for protection at the desired pH. Instead, aluminum nitrate must be continuously present in the wash solution to maintain adequate protection at the elevated pH's needed for depyrogenation.

BRIEF DESCRIPTION OF THE DRAWINGS

FIGS. 1a-1f are the solubility curves of the dissolved $SiO_2$ levels obtained under the Dynamic Solubility Testing Protocol.

DESCRIPTION OF THE PREFERRED EMBODIMENTS

Figure 1B:
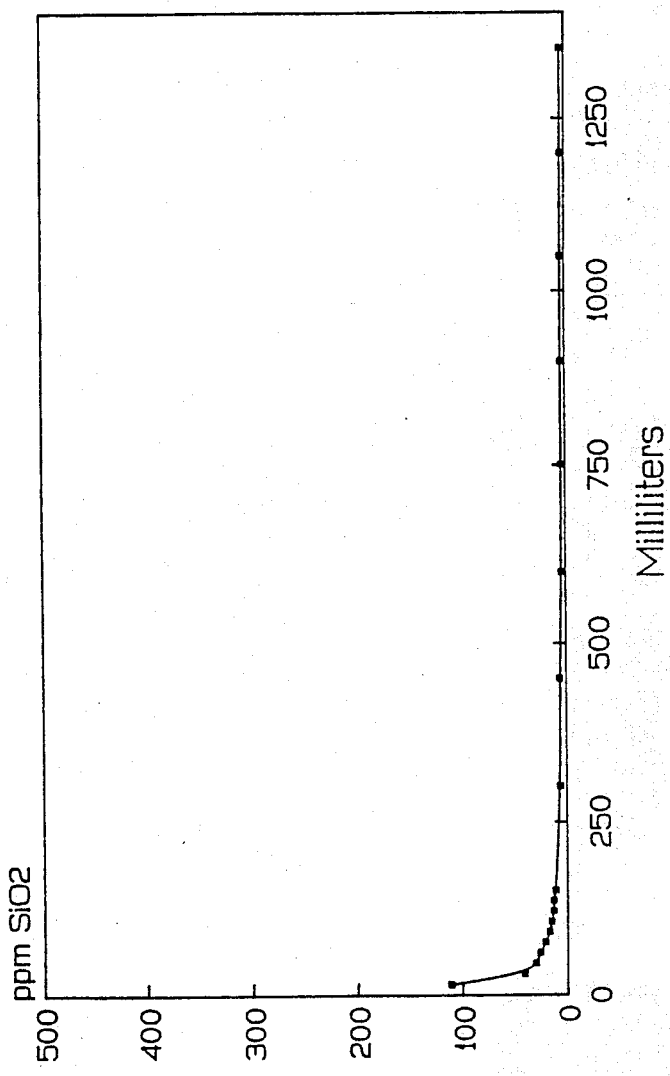

Silica-based chromatographic sorbents are protected during the high pH wash by doping the caustic wash solution with an aluminum or gallium salt such as the preferred salt, aluminum nitrate. In the case of aluminum, it is believed that any aluminum salt form could be used so long as it provides the $Al^{3+}$ ions. Among the salts which have been used are $AlCl_3$, $AlPO_4$, $Al(NO_3)_3$ and aluminum acetate. It is expected that other commercially available Al salts would also be operables including $(Al)_2(SO_4)_3$.

In one embodiment a solid form of aluminum such as alumina could be used as the source of aluminum ions. If the alumina is placed at the top of the column, the caustic will pass over the alumina and dissolve out a sufficient amount of aluminum ions to provide adequate protection of the silica column.

The amount of the aluminum salt, such as aluminum nitrate, to be used will vary depending on at least two factors. First, the amount of surface area of the chromatography support. The larger the surface area, the more $Al^{3+}$ ions required. For silica materials, the surface area is related to the pore diameter. For a support with large pores such as 1000 Angstrom units, there will be a relatively small surface area, whereas for a support with average pores of 500 Angstrom units, there will be a larger surface area which will require more aluminum.

The second factor is the amount of NaOH present. Higher concentrations of NaOH will more readily attack the silica surface, therefore a larger amount of $Al^{3+}$ ions will be needed to provide effective stabilization. Additionally, when an aluminum salt such as aluminum nitrate is used as the aluminum source, the following reaction can take place consuming hydroxide ion in the high pH wash solution and effectively reducing the solution pH.

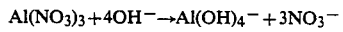

$$Al(NO_3)_3 + 4OH^- \rightarrow Al(OH)_4^- + 3NO_3^-$$

To maintain the necessary hydroxide ion concentration to result in a high pH solution, the composition of the wash solution must take into account the above described reaction where 4 moles of hydroxide ions will be taken up by one mole of $Al^{3+}$ ions. For example, assume that it is desired to have a wash solution containing 0.02N $Al^{3+}$ ion and a final NaOH concentration of 0.5N. One must prepare a 0.58N NaOH solution so that the extra 0.08N NaOH can react with the $Al^{3+}$ to leave 0.5N NaOH concentration. When a larger $Al^{3+}$ concentration is desired such as 0.1 1N $Al^{3+}$, a 0.9N NaOH solution should be prepared to make the effective final concentration 0.5N NaOH.

The amount of the aluminum or gallium dopant should be controlled. When there is an excessive amount of $Al^{3+}$ present, for example, then there may be traces of $Al^{3+}$ contaminant coming out of the column when it is being used which is not desired. Furthermore, when excess $Al^{3+}$ ion is added it will react with the NaOH to form the aluminum hydroxide and this in turn will require the use of larger amounts of NaOH to obtain the desired pH.

When there is a larger amount of $Al^{3+}$ present or in the embodiment where the amount of the caustic agent is low such that the solution pH falls below 13, then hydroxide ion to aluminum ratios of lower than 5:1 can result with insoluble aluminum hydroxide being formed which rapidly fouls the chromatography column. By this we mean that the organic coating is fouled such that one can not do chromatography. When this happens, the fouled columns can be easily regenerated by acid washing. To avoid this problem of fouling and the accompanying need for acid washing, the preferred method of washing the column is to employ a solution with a pH of at least pH 13.

The aluminum ion doped wash solutions effectively protect the silica surface during the washing. However, to realize the maximum benefit from this invention, any organic coating used to confer the chromatographic properties to the silica should be of the polymeric type. Covalently bound, monomeric coatings are not as effectively protected during the column washing. The chromatographic support used in the present invention can be silica, porous glass, kieselgur, diatomaceous earth or mixtures of these materials.

In all cases demonstrated in the examples to follow, washing with just NaOH solutions alone caused catastrophic column failure. Those columns washed with NaOH doped with $Al(NO_3)_3$ survived the test intact with no deterioration of performance.

Cycle Testing Protocol

Chromatographic System: Waters model 840 binary gradient HPLC with UV and conductivity detection and automated sample introduction using a Waters WISP autoinjector with the sample compartment maintained at 6° C.

Eluents:
Buffer "A"—0.01N Tris(hydroxymethyl) aminomethane (TRIS) pH 8 prepared by dissolving 1.21 g Tris in 1 l deionized water and adjusting the solution pH to 8 with 1N HCl.
Buffer "B"—0.1N TRIS+0.5N NaCl pH 8 prepared by dissolving 12.1 g Tris and 28.22 g NaCl in 1 l of deionized water and adjusting the solution pH to 8 with 1N HCl.
Caustic Wash. Prepared with the components described in the examples.
Procedure: The HPLC was programmed for repetitive cycling which proceeded for 100 cycles. Each cycle consisted of a 20 minute linear gradient from buffer "A" to buffer "B" with eluent flow at 1 ml/min. After a 5 minute hold at 100% buffer "B" caustic was introduced through the "B" pump at 1 ml/min. This was followed by a 0.8 ml distilled water wash, and 33 minute reequilibration at 1 ml/min with buffer B to adjust the column pH to 8. The gradient was then immediately recycled to buffer A with reequilibration lasting 15 minutes.

Column durability was monitored two ways. Chromatographic performance was monitored by determining the resolution (Rs)

$$Rs = \frac{2(t_2 - t_1)}{\Delta t_1 + \Delta t_2}$$

of a mixture of the proteins ovalbumin and bovine serum albumin on the column after repeated cycle testing. In this equation, $t_1$ and $t_2$ refer to the retention times of ovalbumin and bovine serum albumin, respectively, and $\Delta t_1$ and $\Delta t_2$ are their respective peak widths at the baseline. Column failure was indicated by a severe decrease in resolution. Another mechanism to measure the column durability is to monitor the physical deterioration of the column. Column physical failure was monitored by measuring the number of cycles completed before fouling of the column with catastrophic bed collapse. Additionally, silica dissolution leads to the formation of a void at the head of the column (hereafter referred to as "void") which can be measured.

Having described the basic aspects of our invention, the following examples are given to illustrate specific embodiments thereof.

EXAMPLE 1

Following the procedure in the cycle testing protocol, a column containing 10 micron particle diameter silica having an average pore diameter of 1000 Angstrom units with about a 4% loading of cross-linked polyethylene imine (PEI) as described in the Alpert U.S. Pat. No. 4,245,005 was washed with 7 column volumes (CV) of a wash solution of 0.3N NaOH+0.04N $Al(NO_3)_3$ after each chromatographic run. The bed survived 99 cycles with no failure, the void was 0 mm and the performance survived 99 cycles with no deterioration.

EXAMPLE 2

Following the procedure in Example 1, a wash solution of 0.5N NaOH+0.002N $Al(NO_3)_3$ was employed. The wash was 2 column volumes. The bed surived 100 cycles with no failure, the void was 2 mm and the performance survived 100 cycles with no deterioration.

EXAMPLE 3

Comparison

Following the procedure in Example 1, a wash solution of 0.5N NaOH was employed without any aluminum according to the present invention. The wash was 2 column volumes. The bed collapsed at 72 cycles, the void was 6.9 cm after collapse and the performance deteriorated after 52 cycles.

EXAMPLE 4

Comparison

Following the procedure in Example 1, a wash solution of 0.5N NaOH was employed without any aluminum according to the present invention. The wash was 4 column volumes. The bed collapsed at 51 cycles, the void was 8.2 cm after collapse and the performance deteriorated after 45 cycles.

EXAMPLE 5

Comparison

Following the procedure in Example 1, a wash solution of 0.5N NaOH was employed without any aluminum according to the present invention. The wash was 4 column volumes. The bed collapsed at 65 cycles, the void was 8.4 cm after collapse and the performance deteriorated after 45 cycles.

EXAMPLE 6

Following the procedure in Example 1, a wash solution of 0.5N NaOH+0.002N $Al(NO_3)_3$ was employed. The wash was 4 column volumes. The bed survived 100 cycles with no failure, the void was 2 mm and the performance survived 100 cycles with no deterioration.

EXAMPLE 7

Following the procedure in Example 1, a wash solution of 0.5N NaOH+0.002N $Al(NO_3)_3$ was employed. The wash was 4 column volumes. The bed survived 104 cycles with no failure, the void was 3 mm and the performance survived 104 cycles with no deterioration.

In all cases demonstrated in the examples to follow, washing with just alkaline solutions alone resulted in high levels of silica dissolution. Those columns washed with caustic solutions doped with aluminum showed significantly reduced silica dissolution.

Dynamic Solubility Testing Protocol

Apparatus:
Waters Model 510 HPLC pump and a LKB 2112 Redirac fraction collector
Wash Solutions:
Prepared as described in the examples below.
Procedure:
About 1400 ml of wash solution was pumped through a 25×0.41 cm stainless steel HPLC column with 2 micron frits packed with 10 micron particle 1000 Angstrom units. Fifteen milliliter fractions polyethylene tubes, and dissolved $SiO_2$ levels were determined by Atomic Absorption Spectroscopy. Dynamic Solubility curves thus generated for NaOH and aluminum ion doped NaOH can be compared to demonstrate the suppressed silica solubility.

EXAMPLE 8

Following the procedure in the Dynamic solubility protocol, a column packed with silica particles having no organic coating was washed with 0.108N NaOH+0.002N $Al(NO_3)_3$ The solubility curve generated is shown in FIG. 1a.

EXAMPLE 9

Following the procedure in the Dynamic solubility protocol, a wash solution of 0.18N+0.02N $AlCl_3$ was employed. The solubility curve generated is shown in FIG. 1b.

EXAMPLE 10

Figure 1C:
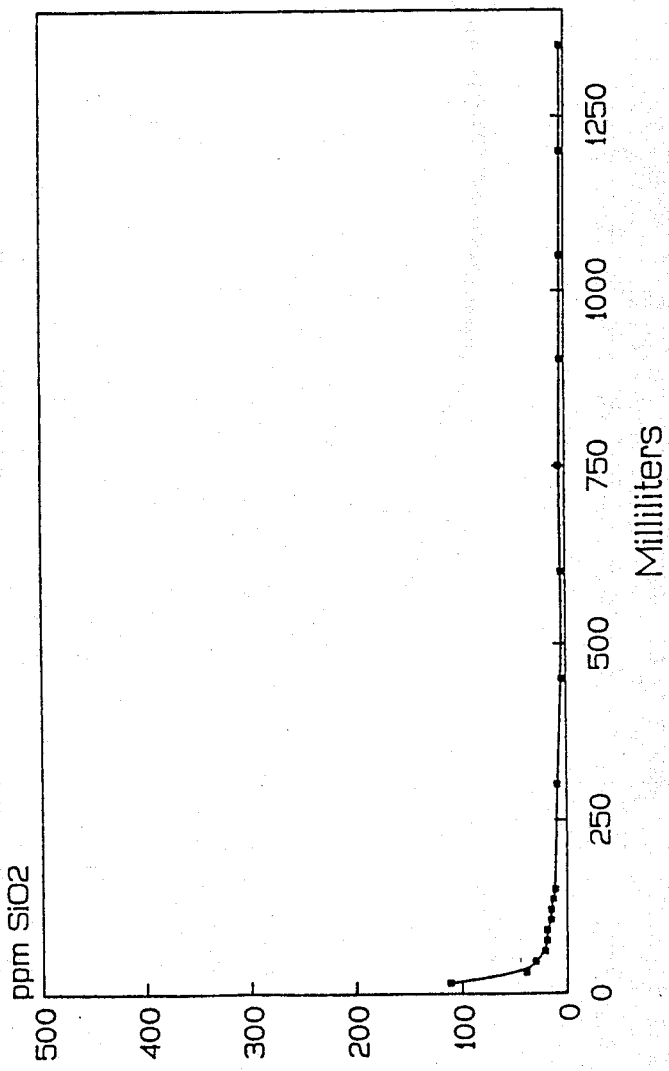

Following the procedure in the Dynamic solubility protocol, a wash solution of 0.18N NaOH+0.02N $AlPO_4$ was employed. The solubility curve generated is shown in FIG. 1c.

EXAMPLE 11

Following the procedure in the Dynamic solubility protocol, a wash solution of 0.1 N NaOH was employed. The solubility curve generated is shown in FIG. 1d.

EXAMPLE 12

Figure 1E:
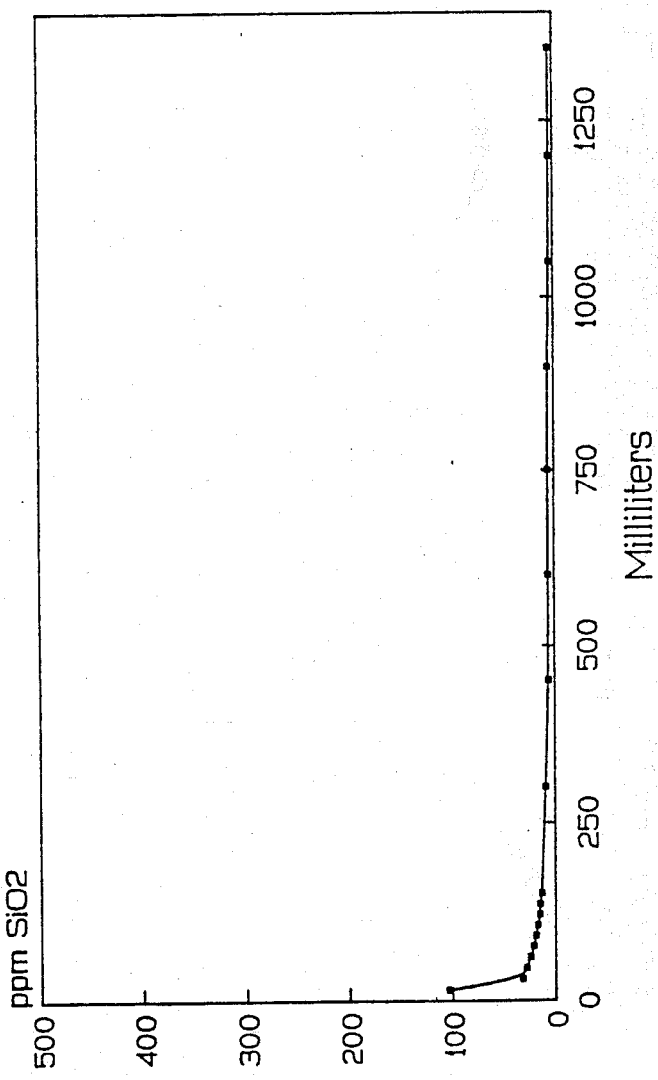

Following the procedure in the Dynamic solubility protocol, a wash solution of 0.18N KOH+0.02N $Al(NO_3)_3$ was employed. The solubility curve generated is shown in FIG. 1e.

EXAMPLE 13

Figure 1F:
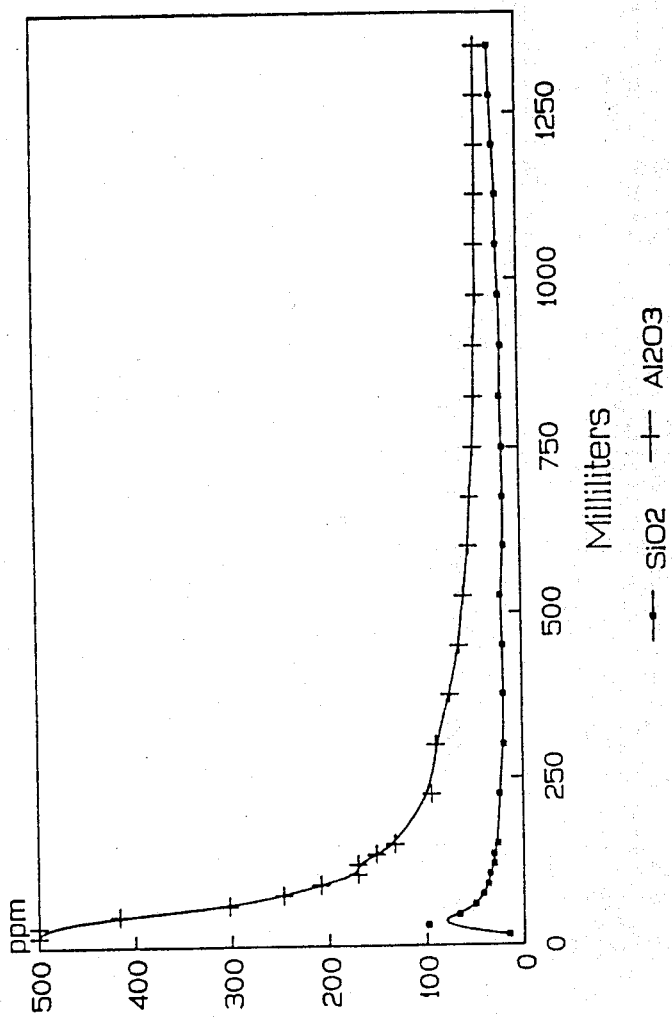

In this example a 25×0.41 cm column packed with a commercially available alumina (Universal adsorbents w-alumina, neutral, lot #UA1983, 8 micron particles) was included in-line as a solid aluminum source ahead of a 25×0.41 cm column packed with 10 micron particle diameter silica having an average pore diameter of 1000 Angstrom units and no organic coating. A solution of 0.18N NaOH was pumped through the coupled columns as described in the Dynamic Solubility testing protocol. The solubility curve generated is shown in FIG. 1f.

In summary, from these examples it can be concluded that column washing protocols which employ just NaOH solutions to clean silica-based chromatographic sorbents cause significant deterioration of the chromatographic bed and performance due to rapid dissolution of the silica support. Addition of aluminum ions to the caustic wash solution effectively suppresses the silica dissolution during the high pH wash, and provides a significantly improved useful lifetime of the chromatographic column.

It is understood that the foregoing detailed description is given merely by way of illustration and that many variations may be made therein without departing from the spirit of this invention.

What I claim is:

1. A method of cleaning a silica containing chromatographic sorbent comprising using as the wash solution a caustic solution having a caustic agent dissolved in water with pH above pH 8 and having aluminum or gallium ions present at an effective concentration so as to prevent deterioration of the sorbent.

2. A method according to claim 1, wherein the pH of the caustic solution is at least 13.

3. A method according to claim 1, wherein the source of aluminum ions is a soluble aluminum salt.

4. A method according to claim 3, where the source of aluminum ions is selected from the group consisting of $Al(NO_3)_3$, $AlCl_3$, $AlPO_4$, $(Al)_2(SO_4)_3$, aluminum acetate and mixtures thereof.

5. A method according to claim 1, wherein the source of aluminum ions is a solid aluminum source.

6. A method according to claim 5, where the source of aluminum ions is alumina.

7. A method according to claim 1, wherein the caustic agent is selected from the group consisting of NaOH, KOH, or $NH_4OH$, and mixtures thereof.

8. A method according to claim 7, wherein the caustic agent is NaOH.

9. A method according to claim 1, wherein the chromatography media is an anion-exchange sorbent.

10. A method according to claim 9, wherein said anion-exchange sorbent comprises an inorganic chromatographic support and a chromatographically active organic coating.

11. A method according to claim 10, wherein the anion-exchange sorbent comprises a stabilized organic coating stationary phase non-covalently attached to a chromatographic support particle.

12. A method according to claim 11, wherein the chromatographic support is selected from the group consisting of silica, porous glass, kieselgur, diatomaceous earth and mixtures thereof.

13. A method according to claim 12, wherein the chromatographic support is silica.

14. A method according to claim 10, wherein the chromatographic support is silica.

15. A method according to claim 2, wherein the caustic solution is a sodium hydroxide solution having a concentration of from about 0.1 to 1 normal.

16. A method according to claim 1, wherein the aluminum ions are present at a concentration of 0.0005 to 0.1 normal.

* * * * *